(12) United States Patent
Zeimis, III

(10) Patent No.: US 8,944,506 B2
(45) Date of Patent: Feb. 3, 2015

(54) CLOCK SPRING ASSEMBLY

(75) Inventor: Peter Paul Zeimis, III, Shelby Township, MI (US)

(73) Assignee: Magna Seating Inc., Aurora, Ontario (CA)

( * ) Notice: Subject to any disclaimer, the term of this patent is extended or adjusted under 35 U.S.C. 154(b) by 227 days.

(21) Appl. No.: 13/596,720

(22) Filed: Aug. 28, 2012

(65) Prior Publication Data

US 2013/0057039 A1    Mar. 7, 2013

Related U.S. Application Data

(60) Provisional application No. 61/530,127, filed on Sep. 1, 2011.

(51) Int. Cl.
| B60N 2/14 | (2006.01) |
| B60N 2/68 | (2006.01) |
| F16F 1/10 | (2006.01) |
| B60N 2/16 | (2006.01) |
| B60N 2/44 | (2006.01) |

(52) U.S. Cl.
CPC .............. *B60N 2/1675* (2013.01); *B60N 2/682* (2013.01); *B60N 2/4435* (2013.01); *F16F 1/10* (2013.01)
USPC .......................................... 297/333; 297/331

(58) Field of Classification Search
USPC ......... 297/331.333, 301.4, 300.5, 302.4, 292, 297/265.1, 327, 324, 451.7, 411.32, 378.12, 297/15; 267/156
See application file for complete search history.

(56) References Cited

U.S. PATENT DOCUMENTS

| 2,828,803 | A | * | 4/1958 | Howe et al. .................... 297/333 |
| 3,958,828 | A | * | 5/1976 | Ishida et al. ................ 297/361.1 |
| 4,475,769 | A | * | 10/1984 | Crawford et al. ............. 297/331 |
| 5,803,546 | A | * | 9/1998 | Yamazaki ...................... 297/333 |
| 5,881,854 | A | * | 3/1999 | Rougnon-Glasson .......... 192/15 |
| 6,024,411 | A | * | 2/2000 | Pesta et al. ..................... 297/325 |
| 6,361,098 | B1 | * | 3/2002 | Pesta et al. ................. 296/65.03 |
| 6,626,495 | B2 | * | 9/2003 | Okazaki et al. ........... 297/367 R |
| 6,843,533 | B1 | * | 1/2005 | Miyata et al. ............. 297/367 R |
| 6,880,887 | B2 | * | 4/2005 | Hoshihara et al. ........ 297/367 R |
| 6,896,309 | B2 | | 5/2005 | Satoh et al. |
| 6,923,504 | B1 | * | 8/2005 | Liu et al. ................... 297/367 R |
| 7,066,541 | B2 | * | 6/2006 | Uramichi .................. 297/367 R |
| 7,121,609 | B2 | | 10/2006 | Tame |
| 7,152,925 | B2 | * | 12/2006 | Hur et al. ................. 297/378.13 |
| 7,165,801 | B2 | | 1/2007 | Tame et al. |
| 7,325,850 | B2 | | 2/2008 | Tame |
| 7,374,242 | B2 | * | 5/2008 | Champ et al. ................. 297/331 |
| 7,484,785 | B2 | | 2/2009 | Weber |

(Continued)

*Primary Examiner* — David R Dunn
*Assistant Examiner* — Timothy J Brindley
(74) *Attorney, Agent, or Firm* — Miller Canfield

(57) ABSTRACT

A clock spring assembly includes a first member pivotally coupled to a second member about a pivot axis. The first member defines an inner space and the second member also defines an inner space. At least a portion of the second member is disposed within the inner space of the first member. A support member is disposed within the inner space of the second member and is coupled thereto. A pivot shaft is coaxial with the pivot axis and pivotally couples the first and second members together. A clock spring is disposed within the inner space of the second member and is wound around the support member. The clock spring extends between a first end engaged with the support member and a second end engaged with the first member. The clock spring biases the first member to pivot relative to the second member about the pivot axis.

18 Claims, 4 Drawing Sheets

(56) References Cited

U.S. PATENT DOCUMENTS

| | | | |
|---|---|---|---|
| 7,543,890 B1 * | 6/2009 | Sasaki et al. | 297/378.12 |
| 7,766,429 B2 * | 8/2010 | Kuroda et al. | 297/367 P |
| 7,819,479 B2 * | 10/2010 | Halbig et al. | 297/378.14 |
| 8,251,450 B2 * | 8/2012 | Carroll et al. | 297/334 |
| 8,408,648 B2 * | 4/2013 | Champ | 297/335 |
| 2005/0077770 A1 * | 4/2005 | Lang et al. | 297/331 |
| 2006/0061174 A1 * | 3/2006 | Saberan | 297/331 |
| 2006/0131946 A1 * | 6/2006 | Andrigo et al. | 297/378.1 |
| 2006/0175875 A1 | 8/2006 | Syrowik et al. | |
| 2007/0029714 A1 * | 2/2007 | Fisher | 267/155 |
| 2007/0182231 A1 * | 8/2007 | Lutzka et al. | 297/378.12 |
| 2007/0246985 A1 * | 10/2007 | Sahi | 297/331 |
| 2008/0185892 A1 * | 8/2008 | Peters et al. | 297/362 |
| 2010/0026073 A1 * | 2/2010 | Bruck et al. | 297/378.1 |
| 2010/0109404 A1 * | 5/2010 | Yamagishi et al. | 297/341 |
| 2010/0270839 A1 * | 10/2010 | Moegling et al. | 297/332 |
| 2010/0289313 A1 * | 11/2010 | Moegling et al. | 297/332 |
| 2011/0006574 A1 * | 1/2011 | Carroll et al. | 297/316 |
| 2011/0049953 A1 * | 3/2011 | Champ | 297/326 |
| 2011/0084533 A1 * | 4/2011 | Bruck et al. | 297/367 R |
| 2011/0101762 A1 * | 5/2011 | Lutzka et al. | 297/408 |
| 2011/0187170 A1 * | 8/2011 | Lin et al. | 297/333 |
| 2012/0104820 A1 * | 5/2012 | Muck | 297/341 |
| 2012/0169105 A1 * | 7/2012 | Assmann et al. | 297/367 P |
| 2013/0234488 A1 * | 9/2013 | Pleskot | 297/354.12 |
| 2014/0001807 A1 * | 1/2014 | McCulloch et al. | 297/366 |

* cited by examiner

CLOCK SPRING ASSEMBLY

CROSS-REFERENCE TO RELATED APPLICATION

This application claims priority to and all the benefits of U.S. Provisional Application Ser. No. 61/530,127, filed Sep. 1, 2011.

BACKGROUND OF THE INVENTION

1. Field of the Invention

The present invention relates to a spring assembly for a seat assembly of an automotive vehicle. More particularly, the present invention relates to a clock spring assembly for biasing a first member to pivot relative to a second member.

2. Description of Related Art

Conventional folding seat assemblies in automotive vehicles commonly include clock springs for biasing one member or component of the seat assembly relative to another member or component of the seat assembly. FIG. 1 illustrates a portion of a conventional folding seat assembly 10 according to the prior art. The seat assembly 10 includes a seat riser or seat cushion frame 12 and a pair of front legs 14 for supporting the seat cushion frame 12 above a vehicle floor 16. The seat assembly 10 includes a pivotal connection between the seat cushion frame 12 and each of the front legs 14. More specifically, a forward end 18 of the seat cushion frame 12 is pivotally coupled to an upper end 20 of each one of the front legs 14 for pivotal movement about a laterally extending pin 22. A clock spring 24 is mounted in an outboard position relative to the seat cushion frame 12 and is positioned adjacent to each one of the front legs 14 for biasing the seat cushion frame 12 relative to the front legs 14. Each clock spring 24 extends between a first end engaged with a slot 26 in the pin 22 and a second end engaged with a post 28 secured to the front leg 14. The clock springs 24 bias the seat cushion frame 12 relative to the front legs 14 about the pins 22. The clock springs 24 bias the seat cushion frame 12 in a counter-clockwise direction (when viewed from FIG. 1) about the pins 22 to assist with moving the seat assembly 10 from a seating position, shown in FIG. 1, to an easy-entry or cargo position (not shown). It is desirable, however, to package the clock springs 24 within the pivotal connection between the seat cushion frame 12 and the front legs 14.

SUMMARY

A clock spring assembly includes a first member pivotally coupled to a second member about a pivot axis. The first member defines an inner space. The second member also defines an inner space and is sized such that at least a portion of the second member fits within the inner space of the first member. A support member is disposed within the inner space of the second member and is coupled to the second member. A pivot shaft is coaxial with the pivot axis and pivotally couples the first and second members together. A clock spring is disposed within the inner space of the second member and is wound around the support member. The clock spring extends between a first end that is engaged with the support member and a second end that is engaged with the first member. The clock spring biases the first member to pivot relative to the second member about the pivot axis.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
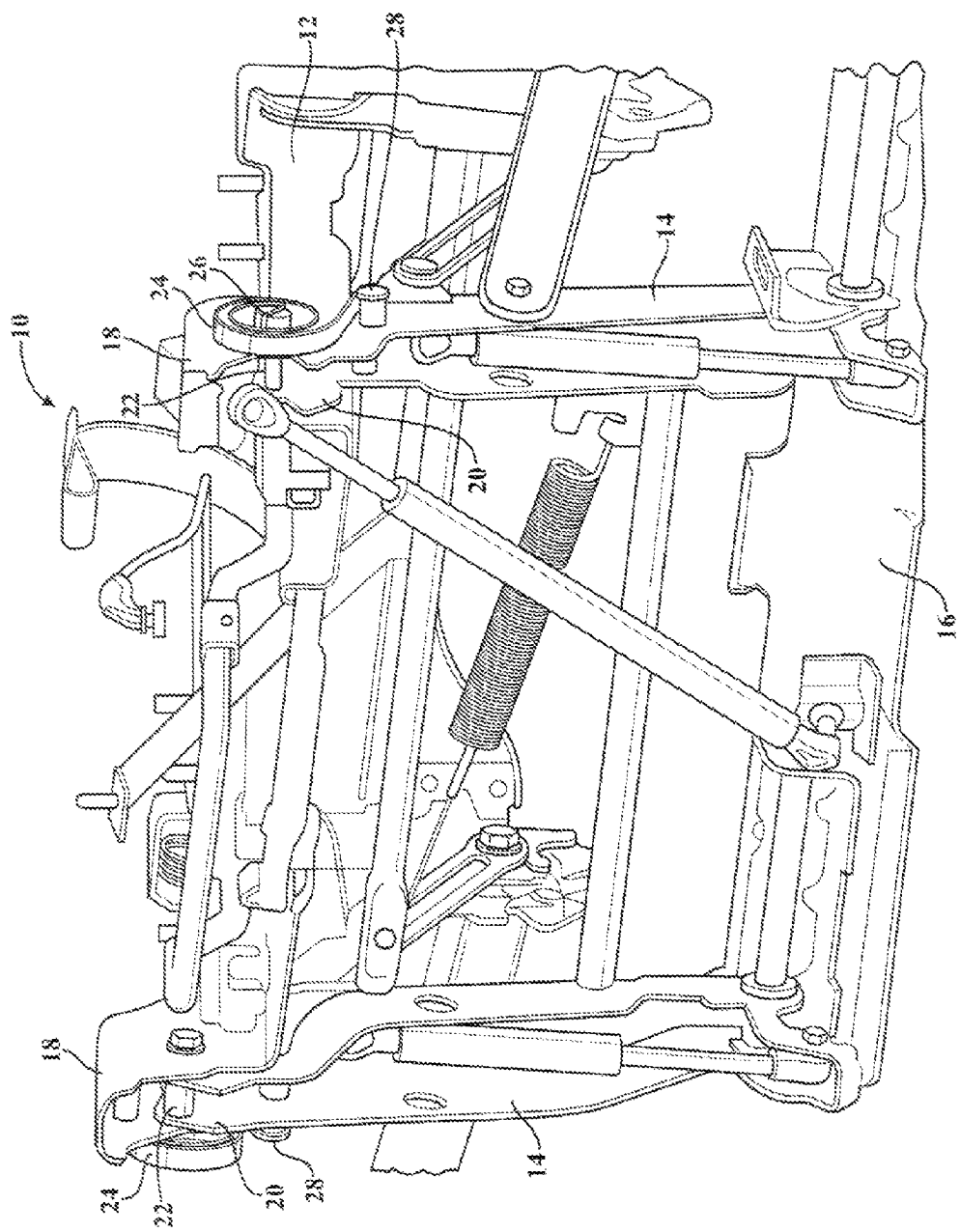
FIG. 1 is a perspective view of a seat assembly illustrating a pivotal connection between a seat cushion frame and a front leg including a clock spring according to the prior art.
Figure 2:
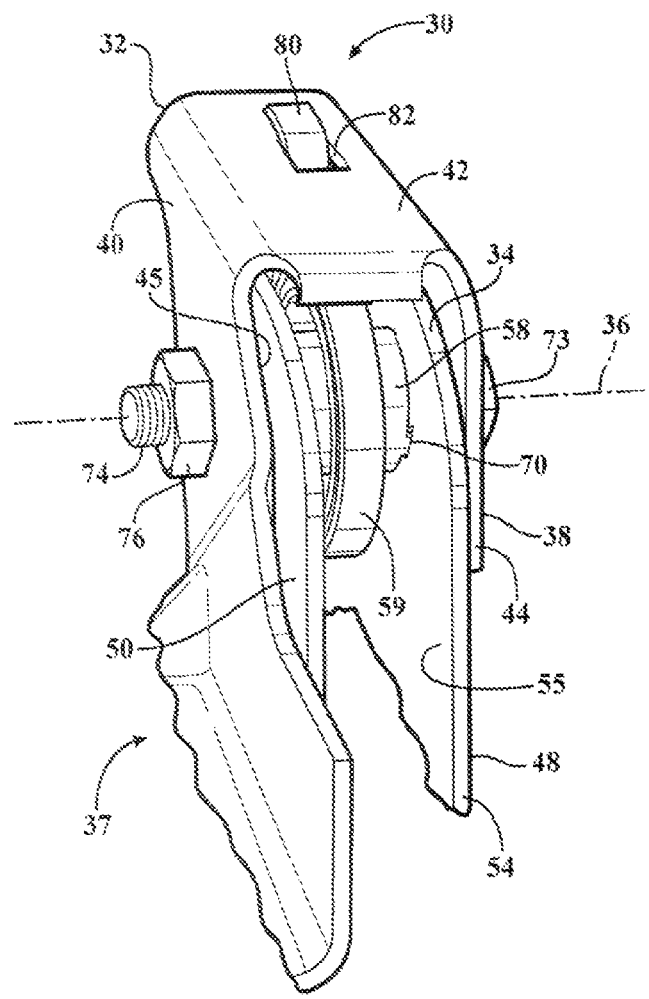
FIG. 2 is a perspective view of a portion of a seat assembly incorporating a clock spring assembly according to one embodiment of the invention.
Figure 3:
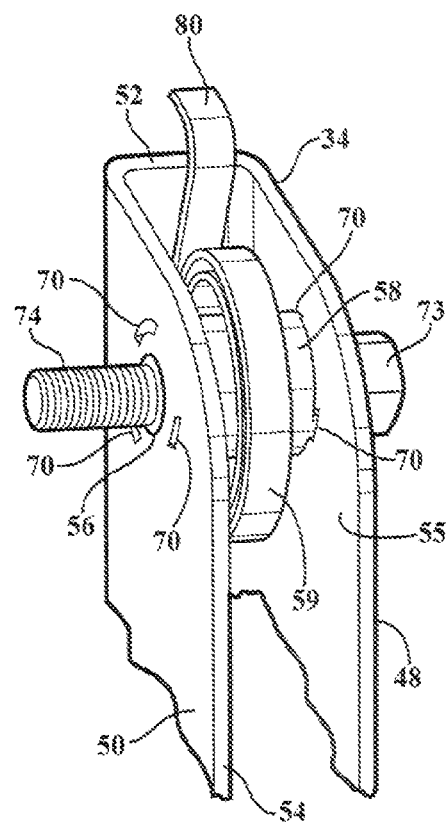
FIG. 3 is a perspective view of the portion of the seat assembly shown in FIG. 2 with a seat cushion frame removed for clarity.

Referring to the Figures, wherein like numerals indicate like or corresponding parts throughout the several views, a clock spring assembly is generally shown at 30. The clock spring assembly 30 includes a first member 32 that pivots relative to a second member 34 about a pivot axis 36 extending in a lateral direction. As a practical example, a portion of a vehicle seat assembly is shown generally at 37. With respect to the seat assembly 37, the first member 32 could be a seat riser or seat cushion frame and the second member 34 could be a front leg supporting the seat cushion frame above a floor in an automotive vehicle.

The first member or seat cushion frame 32 includes first and second sides 38, 40 that are spaced apart in the lateral direction. The first and second sides 38, 40 extend between a closed end 42 and an opposite open end 44. Thus, the first member 32 has a generally C-shaped cross-section defining an inner space 45. Each one of the first and second sides 38, 40 of the first member 32 includes a bore 46 extending therethrough. The bores 46 are aligned and are coaxial with the pivot axis 36.

Similarly, the second member or front leg 34 includes first and second sides 48, 50 that are spaced apart in the lateral direction. The first and second sides 48, 50 extend between a closed end 52 and an opposite open end 54. Thus, the second member 34 also has a generally C-shaped cross-section defining an inner space 55. Each one of the first and second sides 48, 50 of the second member 34 includes a bore 56 extending therethrough. The bores 56 are aligned and are coaxial with the pivot axis 36.

At least a portion of the second member 34 is sized to fit within the inner space 45 of the first member 32. Specifically, the first and second sides 48, 50 of the second member 34 fit between the first and second sides 38, 40 of the first member 32. For example, the first side 48 of the second member 34 is adjacent to an inner surface of the first side 38 of the first member 32 and the second side 50 of the second member 34 is adjacent to an inner surface of the second side 40 of the first member 32. The bores 56 of the second member 34 are coaxial with the bores 46 of the first member 32.

A support member 58 is fixedly secured to the second member 34 to provide an engagement surface for one end of a clock spring 59. The support member 58 is generally cylindrical and is disposed within the inner space 55 of the second member 34 between the first and second sides 48, 50 thereof such that the support member 58 is coaxial with the bores 56.

In one embodiment, the support member 58 is formed from a rectangular strip that is stamped and then rolled. The support member 58 has a first edge 60 and a second edge 61 and extends in a circumferential direction between a first end 62 and a second end 64. The support member 58 includes a series of tabs 66 disposed along one edge. In the present embodiment, the tabs 66 protrude from the first edge 60 of the support member 58. Each tab 66 defines a relief 67 for engaging with the second member 34 as is described below. More specifically, each tab 66 protrudes from the first edge 60 of the support member 58 and includes a distal end 68 that is spaced apart from the first edge 60 and extends generally parallel to the first edge 60, thereby defining the relief 67 between the distal end 68 and the first edge 60. The first end 62 of the support member 58 includes a recess 69 to act as the engagement surface for the clock spring 59.

Figure 6:
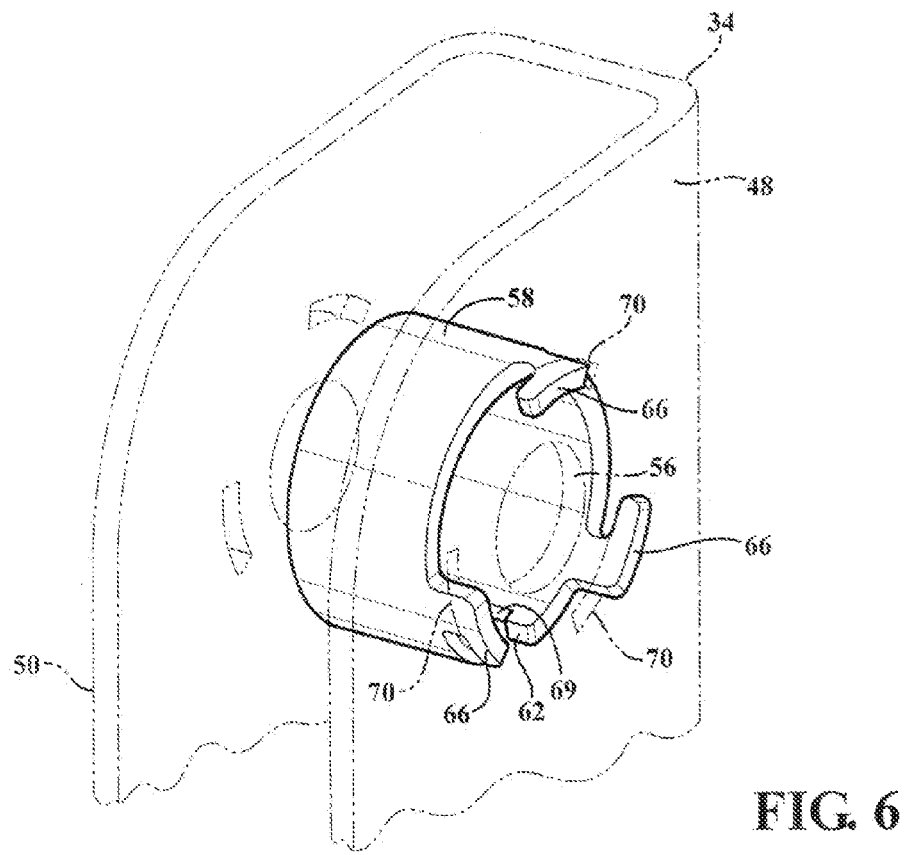
FIG. 6 is a perspective view illustrating the support member fixedly secured to a front leg of the seat assembly.

The support member 58 is secured to the second member 34 by inserting the tabs 66 into corresponding slots 70 in one of the first and second sides 48, 50 and then rotating the support member 58 in order to engage the reliefs 67 with the second member 34. Once the support member 58 is rotated to engage the reliefs 67 with the second member 34, the distal ends 68 prevent the tabs 66 from being withdrawn from the slots 70 in the lateral direction. Rather, the support member 58 must be rotated in the opposite direction to disengage the reliefs 67 from the second member 34 in order to withdraw the tabs 66 from the slots 70. In the present embodiment, each of the first and second sides 48, 50 of the second member 34 includes three slots 70 disposed circumferentially around the bores 56 and the support member 58 includes three tabs 66. The tabs 66 are inserted into the slots 70 in the first side 48 of the second member 34 and the support member 58 is rotated in a first direction (counterclockwise when viewed from FIG. 6) to engage the reliefs 67 with the second member 34, thereby preventing removal of the tabs 66 from the slots 70. In addition, once assembled, the clock spring 59 urges the support member 58 in the first direction to retain the tabs 66 in the slots 70. It is appreciated that the tabs 66 will be inserted into the slots 70 in the second member 34 such that the clock spring 59 will always urge the support member 58 in a direction that will retain the tabs 66 in the slots 70. Therefore, depending on the orientation of the clock spring 59, the tabs 66 will be inserted into the slots 70 in one of the first and second sides 48, 50 of the second member 34.

A pivot shaft or shoulder bolt 72 is coaxial with the pivot axis 36 and extends in the lateral direction to pivotally couple the first and second members 32, 34 together. The pivot shaft 72 extends through the bores 46 in the first member 32 and the bores 56 in the second member 34. The pivot shaft 72 also extends through the support member 58. The pivot shaft 72 includes a head 73 seated against an outer surface of the first side 38 oldie first member 32 and a threaded distal end 74 that protrudes beyond an outer surface of the second side 40 of the first member 32. A nut 76 is threadably secured to the distal end 74 of the pivot shaft 72 to retain the first and second members 32, 34 together. It is appreciated that bushings or spacers (not shown) may be disposed around the pivot shaft 72 and arranged between the inner surface of the first and second sides 38, 40 of the first member 32 and an outer surface of the first and second sides 48, 50 of the second member 34 to provide for smooth pivotal movement therebetween.

The clock spring 59 biases the first member 32 to pivot relative to the second member 34 about the pivot axis 36. The clock spring 59 extends between a first end 78 and a second end 80. The first end 78 of the clock spring 59 is engaged with the recess 69 in the support member 58 and the second end 80 extends through an aperture 82 in the dosed end 42 of the first member 32 and is engaged with the first member 32. Beginning at the first end 78, the clock spring 59 is wound circumferentially around the support member 58 in the first direction such that the clock spring 59 biases the first member 32 to pivot relative to the second member 34 about the pivot axis 36 in a second direction opposite the first direction.

In an alternative embodiment, the second end 80 of the clock spring 59 may be engaged with some other structure that is fixed to the first member 32 without varying from the scope of the invention. For example, the second end 80 of the clock spring 59 may be engaged with a pin (not shown) extending in the lateral direction between the first and second sides 38, 40 of the first member 32.

Figure 4:
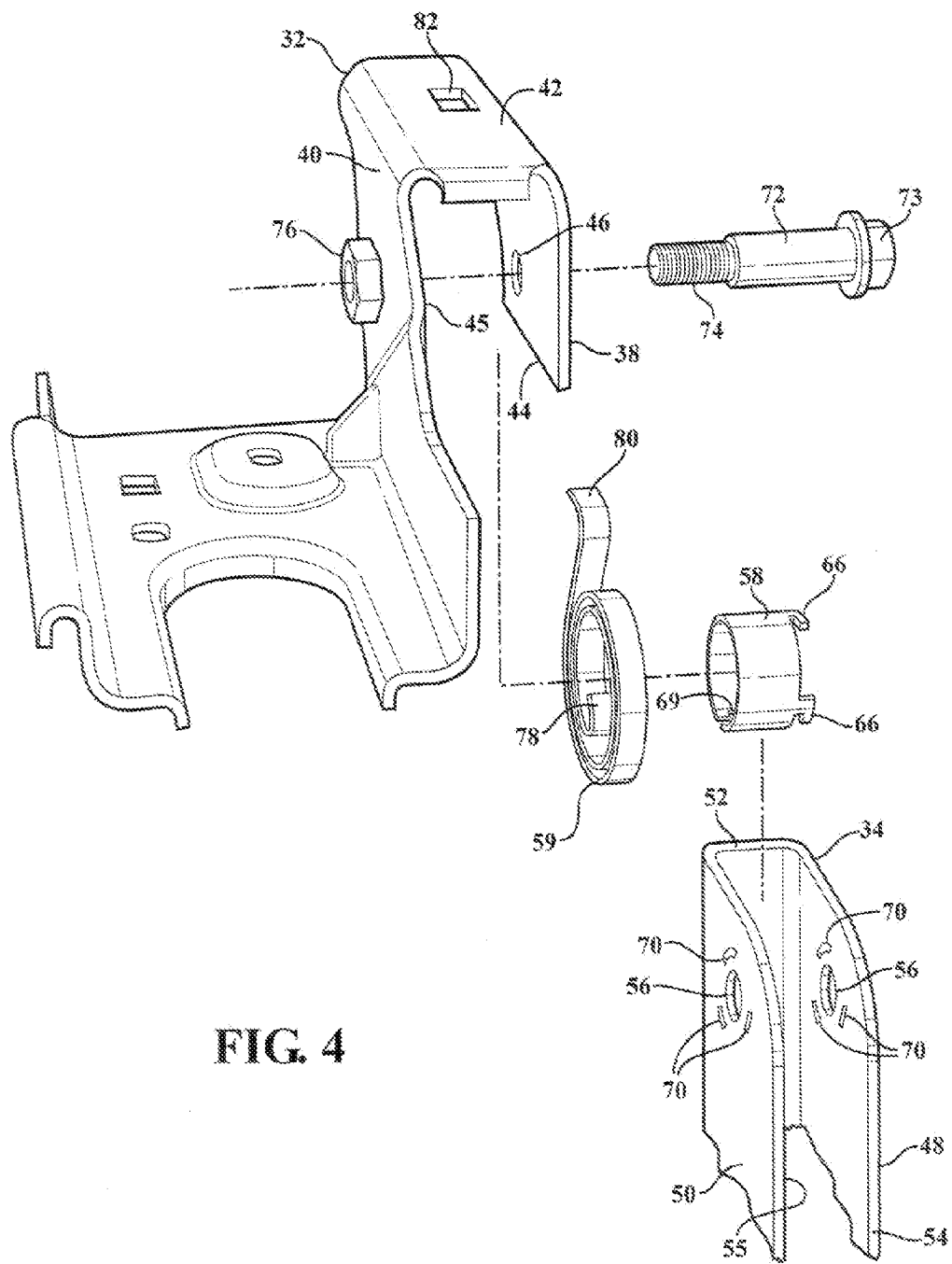
FIG. 4 is an exploded perspective view of the portion of the seat assembly shown in FIG. 2.
Figure 5:
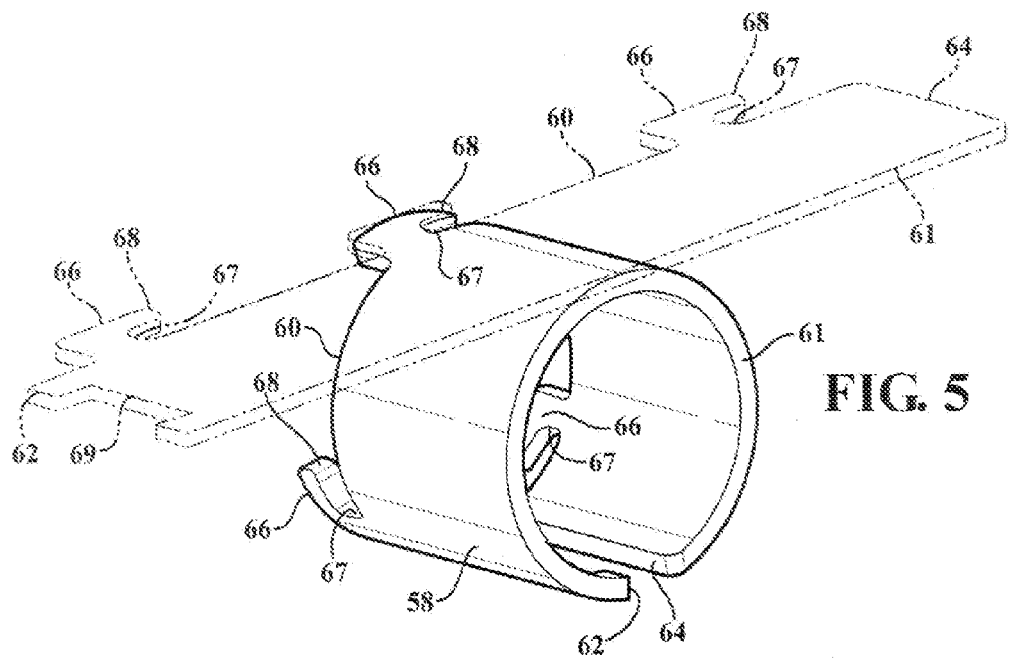
FIG. 5 is a perspective view of a support member of the clock spring assembly illustrating a pre-formed condition and a formed condition.

Referring to FIG. 4, the clock spring assembly 30 is assembled according to the following steps. First, the clock spring 59 is disposed around the support member 58. Second, the support member 58 and the clock spring 59 are positioned within the inner space 55 of the second member 34 between the first and second sides 48, 50 thereof. Third, the tabs 66 on the support member 58 are inserted into the slots 70 in the first side 48 of the second member 34. Fourth, the support member 58 is rotated in the first direction to engage the reliefs 67 with the second member 34 to prevent the tabs 66 from being withdrawn from the slots 70. Fifth, the first end 78 of the clock spring 59 is engaged with the recess 69 in the support member 58. Sixth, the second member 34, the support member 58, and the clock spring 59 are positioned within the inner space 45 of the first member 32 between the first and second sides 38, 40 thereof and at the same time the second end 80 of the clock spring 59 is disposed in the aperture 82 in the closed end 42 of the first member 32 to engage the first member 32. Seventh, the pivot shaft 72 is inserted through the clock spring assembly 30 in the lateral direction. More specifically, the pivot shaft 72 is inserted through the bore 46 in the first side 38 of the first member 32, through the bore 56 in the first side 48 of the second member 34, through the support member 58, through the bore 56 in the second side 50 of the second member 34, and through the bore 46 in the second side 40 of the first member 32. Eighth, the nut 76 is threadably secured to the distal end 74 of the pivot shaft 72.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A clock spring assembly comprising:
   a first member having spaced apart first and second sides defining an inner space therebetween;
   a second member having spaced apart first and second sides defining an inner space therebetween, wherein at least a portion of said second member is disposed within said inner space of said first member;
   a support member fixedly secured to said second member and disposed within said inner space of said second member;
   a pivot shaft extending through said first and second members to pivotally coupled said first and second members together, said pivot shaft defining a pivot axis; and
   a clock spring disposed within said inner space of said second member and extending circumferentially around said support member, wherein said clock spring includes a first end engaged with said support member and a second end engaged with said first member, and wherein said clock spring biases said first member to pivot relative to said second member about said pivot axis; wherein said support member extends in a lateral direction between first and second edges adjacent said respective first and second sides of said second member, and wherein said first edge of said support member includes a plurality of tabs protruding therefrom disposed in slots formed in said first side of said second member wherein each of said tabs includes a distal end spaced apart from said first edge and extending generally parallel to said first edge defining a relief between said distal end and said first edge, said relief engaging said first side of said second member to prevent removal of said plurality of tabs from said slots in said lateral direction thereby fixedly securing said support member to said second member.

2. The clock spring assembly as set forth in claim 1 wherein said first end of said clock spring directly engages said support member and said second end of said clock spring directly engages said first member.

3. The clock spring assembly as set forth in claim 2 wherein said clock spring extends from said first end to said second end in a first direction around said support member such that said clock spring biases said first member to pivot relative to said second member about said pivot axis in a second direction opposite said first direction.

4. A vehicle seat assembly comprising:
a seat cushion frame including a first member, said first member having spaced apart first and second sides defining an inner space therebetween;
a leg pivotally coupled to said seat cushion frame about a pivot axis extending in a lateral direction, said leg including a second member having spaced apart first and second sides defining an inner space therebetween, wherein at least a portion of said second member is disposed within said inner space of said first member;
a support member fixedly secured to said leg and disposed within said inner space of said second member; and
a clock spring extending circumferentially around said support member and including a first end engaging said support member and a second end engaging said seat cushion frame, wherein said clock spring biases said seat cushion frame to pivot relative to said leg about said pivot axis; wherein
said support member extends laterally between first and second edges adjacent said respective first and second sides of said second member, and wherein
said first edge of said support member includes a plurality of tabs protruding therefrom disposed in slots formed in said first side of said second member wherein each of said tabs includes a distal end spaced apart from said first edge and extending generally parallel to said first edge defining a relief between said distal end and said first edge, said relief engaging said first side of said second member to prevent removal of said plurality of tabs from said slots in said lateral direction thereby fixedly securing said support member to said second member.

5. The vehicle seat assembly as set forth in claim 4 wherein said first and second sides of said second member are disposed between said first and second sides of said first member.

6. The vehicle seat assembly as set forth in claim 5 wherein said support member is disposed between said first and second sides of said second member.

7. The vehicle seat assembly as set forth in claim 6 wherein said clock spring is disposed between said first and second sides of said second member.

8. The vehicle seat assembly as set forth in claim 7 including a pivot shaft coaxial with said pivot axis and extending through said seat cushion frame and said leg to pivotally couple said seat cushion frame and said leg together.

9. The vehicle seat assembly as set forth in claim 8 wherein said support member is fixedly secured to one of said first and second sides of said second member.

10. The vehicle seat assembly as set forth in claim 9 wherein said first end of said clock spring directly engages said support member and said second end of said clock spring directly engages said seat cushion frame.

11. The vehicle seat assembly as set forth in claim 10 wherein said clock spring extends from said first end to said second end in a first direction around said support member such that said clock spring biases said seat cushion frame to pivot relative to said leg about said pivot axis in a second direction opposite said first direction.

12. The vehicle seat assembly as set forth in claim 11 wherein said support member encircles said pivot axis.

13. The vehicle seat assembly as set forth in claim 12 wherein said support member is generally cylindrical.

14. The vehicle seat assembly as set forth in claim 13 wherein said slots are disposed circumferentially about said pivot axis.

15. The vehicle seat assembly as set forth in claim 14 wherein said support member extends circumferentially between a first end including a recess and a second end, and wherein said first end of said clock spring directly engages said recess.

16. A method of assembling a vehicle seat assembly including a seat cushion frame having a first member defining an inner space, a leg having a second member defining an inner space, a support member having a plurality of tabs, a clock spring, and a pivot shaft defining a pivot axis extending in a lateral direction, the method of assembling the seat assembly including the steps of:
positioning the clock spring to extend circumferentially around the support member in a first direction;
positioning the clock spring and support member within the inner space of the second member;
inserting the tabs on the support member into slots in the second member;
rotating the support member in the first direction to fixedly secure the support member to the leg;
engaging a first end of the clock spring with the support member;
positioning at least a portion of the second member, the support member and the clock spring within the inner space of the first member;
engaging a second end of the clock spring with the seat cushion frame to bias the seat cushion frame in a second direction about the pivot axis; and
inserting the pivot shaft through the first member, through the second member, through the support member, and through the clock spring to pivotally couple the first and second members together.

17. The method of assembling a vehicle seat assembly as set forth in claim 16 including the step of securing a nut to a distal end of the pivot shaft.

18. The method of assembling a vehicle seat assembly as set forth in claim 17 wherein the step of rotating the support member in a first direction to fixedly secure the support member to the second member includes the step of rotating the support member circumferentially about the pivot axis.

* * * * *